United States Patent [19]

Holmstrom

[11] Patent Number: 4,805,860

[45] Date of Patent: Feb. 21, 1989

[54] SHELF SUPPORT BRACKETS

[76] Inventor: John A. Holmstrom, P.O. Box 63, Palo Cedro, Calif. 96073

[21] Appl. No.: 193,074

[22] Filed: May 12, 1988

[51] Int. Cl.⁴ .............................................. F16L 3/08
[52] U.S. Cl. .................................. 248/220.1; 52/288; 52/716; 248/235; 248/250
[58] Field of Search ................ 248/220.1, 220.2, 235, 248/247, 250; 52/716, 288, 281, 282, 285; 403/403, 205, 231

[56] References Cited

U.S. PATENT DOCUMENTS

| 967,383 | 8/1910 | Hunter | 248/220.1 |
| 3,606,714 | 9/1971 | Arnett | 52/288 X |
| 3,815,162 | 6/1974 | Hall | 248/235 X |
| 4,127,974 | 12/1978 | Wendt | 52/288 |
| 4,444,321 | 4/1984 | Carlstrom | 248/235 |
| 4,712,942 | 12/1987 | Brown | 403/403 X |

Primary Examiner—Ramon O. Ramirez
Attorney, Agent, or Firm—Leonard D. Schappert

[57] ABSTRACT

A shelf support bracket is provided having a front wall and top and bottom walls attached to the front wall and oriented perpendicular thereto but parallel to each other. The top and bottom walls include extensions, which extend beyond the edge of the top wall, and a hole to facilitate attachment to shelving.

5 Claims, 1 Drawing Sheet

U.S. Patent   Feb. 21, 1989   4,805,860

SHELF SUPPORT BRACKETS

BACKGROUND OF THE INVENTION

1. Field of the Invention

The present invention is directed generally toward the area of brackets for use in providing structural support, and more specifically toward brackets specifically designed to support corner shelving.

2. Description of the Prior Art

In the past, inventors have constructed many different sorts of shelving and different brackets for use in supporting shelving. Such devices have included brackets for connecting walls of boxes together to give support at the corners. They have also included circular brackets, sometimes known as pipe brackets, which would allow an individual to attach a piece of flat material to a pipe. Other brackets have included a device resembling an I-beam which slips over two pieces of adjacent material and leveling brackets, which allow an individual to join pieces of material of dissimilar thicknesses. The type of bracket most utilized in giving structural support to shelving has simply included a piece of metal cut in the shape of an L or a T, designed so that one member attaches to one piece of material and a cross-member attaches to another piece of material. Both are screwed to shelves to give some support to the shelves. None of the prior art of which applicant is aware has taught a shelf support bracket having the unique features, capabilities and structure of the present invention.

SUMMARY OF THE INVENTION

The present invention consists of a shelf support bracket which, while it might be constructed of more than one piece of metal, is generally constructed of a single piece of sheet metal or other malleable metal. It could also be constructed of molded plastic or metal. The shelf support bracket of the present invention consists of a bracket having a front wall folded so that a top wall and a bottom wall are created, with a slot bounded by the top wall, the bottom wall and the front wall so that the bracket slides over a piece of wood. The top and bottom walls are formed with extensions which extend beyond the end of the front wall to fit over an adjoining piece of shelving. Once positioned in this way, the shelf support bracket of the present invention gives considerable structural support to corner shelving in closets and in other areas, and in many cases allows the use of much less expensive material, such as compressed wood, in constructing shelving.

One of the objects of the present invention is to provide a shelf support bracket which is capable of effectively supporting corner shelving in a closet where it is difficult to provide support in other ways.

Another object of the present invention is to provide a shelf support bracket which is easily constructed from a single piece of metal by bending.

A further object of the present invention is to provide a shelf support bracket which is easily constructed of plastic.

Another object of the present invention is to provide an inexpensive shelf support bracket which lends structural integrity to shelving upon which it is utilized.

A further object of the present invention is to provide a shelf support bracket which is easily installed.

The foregoing objects, as well as other objects and benefits of the present invention, are made more apparent by the descriptions and claims which follow.

DESCRIPTION OF THE PREFERRED EMBODIMENT

The present invention consists of a shelf support bracket 8 constructed of metal or plastic or any other structural material sufficiently strong to assist in supporting shelving.

Figure 1:
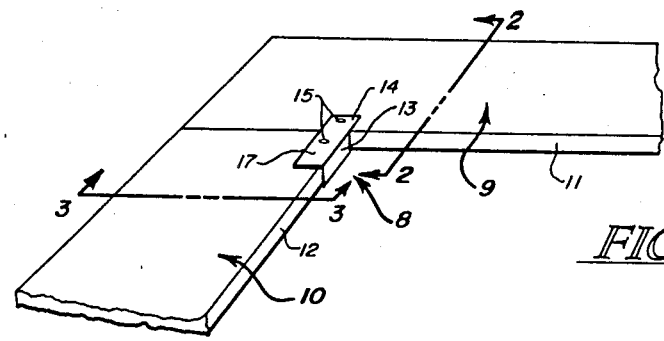
FIG. 1 is a perspective view of a corner shelving arrangement utilizing the shelf support bracket of the present invention.
Figure 4:
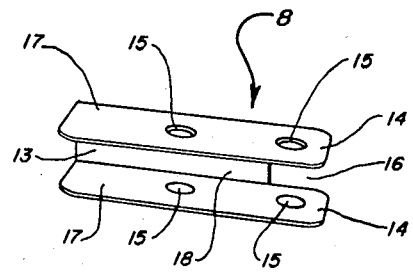
FIG. 4 is a perspective view of the shelf support bracket showing its construction.

FIG. 1 of the drawings is a perspective view of a shelf arrangement utilizing the shelf support bracket 8 of the present invention. A board 10 is positioned so that its end butts against edge 11 of board 9. Normally, the point at which board 10 butts against edge 11 of board 9 would be very weak structurally in a corner shelving arrangement. However, when shelf support bracket 8 of the present invention is slid onto both boards 9 and 10, the point at which the two boards meet is considerably strengthened. The shelf support bracket 8 is bent so that it slides around and over edge 12 of board 10 into position as shown. Shelf support bracket 8 has extension 14, which extends around edge 11 and over board 9 as shown. When shelf support bracket 8 is positioned as shown in FIG. 1, screws may be utilized through holes 15 to attach shelf support bracket 8 substantially rigidly to boards 9 and 10. As is shown in FIG. 4 of the drawings, shelf support bracket 8 has side walls 17, which extend over the edge 12 of board 10, and front wall 13, which butts against edge 12 of board 10. Front wall 13 is shorter than side walls 17, and the portions of side walls 17 extending out beyond front wall 13 are identified as extensions 14. Extensions 14 slide over board 9 as shown.

Figure 2:
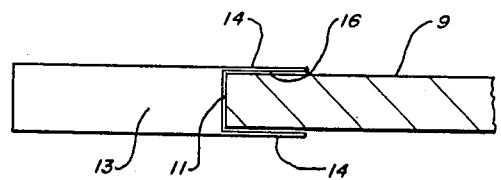
FIG. 2 is a partially cross-sectional view taken along lines 2—2 of FIG. 1 showing how the shelf support bracket is positioned to support shelving.

FIG. 2 of the drawings is a partial cross-section taken along lines 2—2 of FIG. 1 which shows how extensions 14 fit snugly over board 9. The distance between extensions 14 defines an opening 16 into which edge 11 of board 9 fits snugly.

Figure 3:
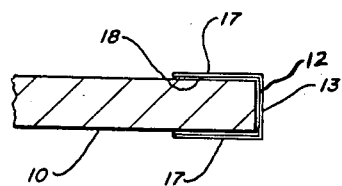
FIG. 3 is a partially cross-sectional view taken along lines 3—3 of FIG. 1 showing how the shelf support bracket is positioned to support shelving.

FIG. 3 is a partially cross-sectional view taken along lines 3—3 of FIG. 1 which further shows how the side walls 17 fit over board 12. Side walls 17 are positioned laterally apart from each other so as to leave an opening 18 therebetween which is sized to fit snugly over board 10. Front wall 13 is positioned against edge 12 of board 10.

FIG. 4 is a perspective view more clearly showing the structure of the shelf support bracket 8. Shelf support bracket 8 may be constructed of plastic or metal cast in the form shown, or a piece of metal bent to that form, or a combination of pieces of material welded together or glued together to form a bracket having the structure as shown. Shelf support bracket 8 as shown has a front wall 13 and side walls 17 oriented substantially perpendicularly to front wall 13 and substantially parallel with respect to each other. The length of side walls 17 is here shown as longer than the length of front wall 13. The portion which extends beyond front wall 13 is identified as extension 14. The distance between extensions 14 is identified as opening 16, and the distance between the main portion of side walls 17 is identified as opening 18. Holes 15 are provided in side walls 17 substantially at the midpoint of front wall 13, and additional holes 15 are provided substantially midway between the point at which front wall 13 ends and the end of extension 14. Holes 15 are utilized to provide for attachment of shelf support bracket 8 to shelves by means of screws, nails or any other attaching means.

While the foregoing description of the invention has shown preferred embodiments using specific terms, such description is presented for illustrative purposes only. It is applicant's intention that changes and variations may be made without departure from the spirit or scope of the following claims, and this disclosure is not intended to limit applicant's protection in any way.

I claim:

1. A shelf support bracket for securing two shelves, comprising:
   an elongated front wall, having:
      first and second ends oriented substantially parallel to each other and third and fourth ends oriented substantially parallel to each other and substantially perpendicular to said first and second ends;
   a top wall oriented substantially perpendicular to said front wall attached to said first end of said front wall and having an extension extending beyond said third end of said front wall, and
   a bottom wall oriented substantially perpendicular to said front wall and substantially parallel to said top wall, attached to said second end of said front wall wherein an opening is defined between said front wall and said top and bottom walls for receiving a first shelf, and a second opening is defined between said wall and said extensions for securing a second shelf perpendicular to said first shelf and having an extension extending beyond said third end of said front wall.

2. The invention of claim 1, including at least one hole extending through said top wall whereby said shelf support bracket attaches to a shelf.

3. The invention of claim 1, including at least one hole positioned at and extending through said extension of said top wall whereby said shelf support bracket attaches to a shelf.

4. The invention of claim 1, wherein said shelf support bracket is constructed of metal.

5. The invention of claim 1, wherein said shelf support bracket is constructed of plastic.

* * * * *